(12) United States Patent
Baughman et al.

(10) Patent No.: US 12,561,812 B2
(45) Date of Patent: Feb. 24, 2026

---

(54) SEGMENTING VOLUMETRIC MEDIA CONTENT WITH ROTATIONAL SPACES

(71) Applicant: International Business Machines Corporation, Armonk, NY (US)

(72) Inventors: Aaron K. Baughman, Cary, NC (US); Sarbajit K. Rakshit, Kolkata (IN); Tushar Agrawal, West Fargo, ND (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 402 days.

(21) Appl. No.: 18/483,839

(22) Filed: Oct. 10, 2023

(65) Prior Publication Data

US 2025/0117945 A1 Apr. 10, 2025

(51) Int. Cl.
*G06T 7/11* (2017.01)

(52) U.S. Cl.
CPC ...... *G06T 7/11* (2017.01); *G06T 2207/20084* (2013.01); *G06T 2207/20132* (2013.01)

(58) Field of Classification Search
CPC ............. G06T 7/11; G06T 2207/20084; G06T 2207/20132
USPC ........................................................ 345/619
See application file for complete search history.

(56) References Cited

U.S. PATENT DOCUMENTS

| | | | |
|---|---|---|---|
| 9,396,547 B2 | 7/2016 | Derzhi et al. | |
| 9,730,643 B2 | 8/2017 | Georgescu et al. | |
| 9,858,496 B2 | 1/2018 | Sun et al. | |

| | | | |
|---|---|---|---|
| 11,120,582 B2 | 9/2021 | Zhou et al. | |
| 11,263,754 B2 | 3/2022 | Gering et al. | |
| 11,288,808 B2 | 3/2022 | Abramoff et al. | |
| 2020/0280730 A1 | 9/2020 | Wang et al. | |

(Continued)

FOREIGN PATENT DOCUMENTS

| | | |
|---|---|---|
| CN | 111091151 A | 5/2020 |
| KR | 100315422 B1 | 11/2001 |

OTHER PUBLICATIONS

Antunes, "Canon and IBM: using volumetric video to promote visual arts," ProVideo Coalition, Jul. 13, 2021, 5 pages, Volumetric Production, accessed Sep. 29, 2023, https://www.provideocoalition. com/canon-and-ibm-using-volumetric-video-to-promote-visual-arts/.

(Continued)

*Primary Examiner* — David T Welch
(74) *Attorney, Agent, or Firm* — Yee & Associates, P.C.

(57) ABSTRACT

Cropping volumetric media is provided. Received volumetric video data is represented by a Bloch sphere. A user selected sub-volume is received to which the volumetric video data is to be cropped. CNNs having different strides are applied to sub-spheres defined within the Bloch sphere. The CNNs generate a correlation score for each sub-sphere relative to a user specified parameter. Best rotation matrices for the sub-spheres are determined to achieve a user specified angle of view, and the sub-sphere correlation scores are optimized according to the best rotation matrices. Cylindrical weights are applied to the sub-spheres according to the optimized correlation scores, and a best solution is selected for the sub-volume according to the correlation scores. The rotation matrices are reflected orthogonally onto the sub-volume, and the sub-volume is cropped from the volumetric video according to the sub-sphere with the highest correlation score to create the cropped image.

20 Claims, 6 Drawing Sheets

(56) References Cited

U.S. PATENT DOCUMENTS

2021/0192259 A1    6/2021    Song et al.
2022/0301224 A1    9/2022    Zhang

OTHER PUBLICATIONS

Canon, "Canon and IBM Japan Form Joint Business Operation Utilizing Volumetric Video Technology to Promote the Visual and Performing Arts," Jul. 7, 2021, 4 pages, Canon Singapore Pte. Ltd., accessed Sep. 29, 2023, https://sg.canon/en/consumer/form-joint-utilizing-volumetric-video-technology/news.

Cohen, "Welcome to the Netaverse, Where Brooklyn Nets Players Can Be Seen in a Whole New (3D) Light," Sports Business Journal, Feb. 3, 2022, 3 pages, Leaders Group, accessed Sep. 29, 2023, https://www.sportsbusinessjournal.com/Daily/Issues/2022/02/03/Technology/welcome-to-the-netaverse-where-brooklyn-nets-players-can-be-seen-in-a-whole-new-3d-light.

IBM, "Advertising Accelerator," The Weather Company Accelerator, 9 pages, International Business Machines Corporation, accessed Sep. 29, 2023, https://www.ibm.com/products/weather-company-advertising-accelerator.

IBM, "Canon, Inc. and IBM Launch Collaboration in Entertainment and the Arts in Japan," Jul. 15, 2021, 2 pages, IBM, Armonk, NY, accessed Sep. 29, 2023, https://newsroom.ibm.com/2021-07-15-Canon,-Inc-and-IBM-Launch-Collaboration-in-Entertainment-and-the-Arts-in-Japan.

IBM, "The Weather Company," 6 pages, International Business Machines Corporation, accessed Sep. 29, 2023, https://www.ibm.com/weather/industries/advertising.

COMPUTING ENVIRONMENT
100

FIG. 1

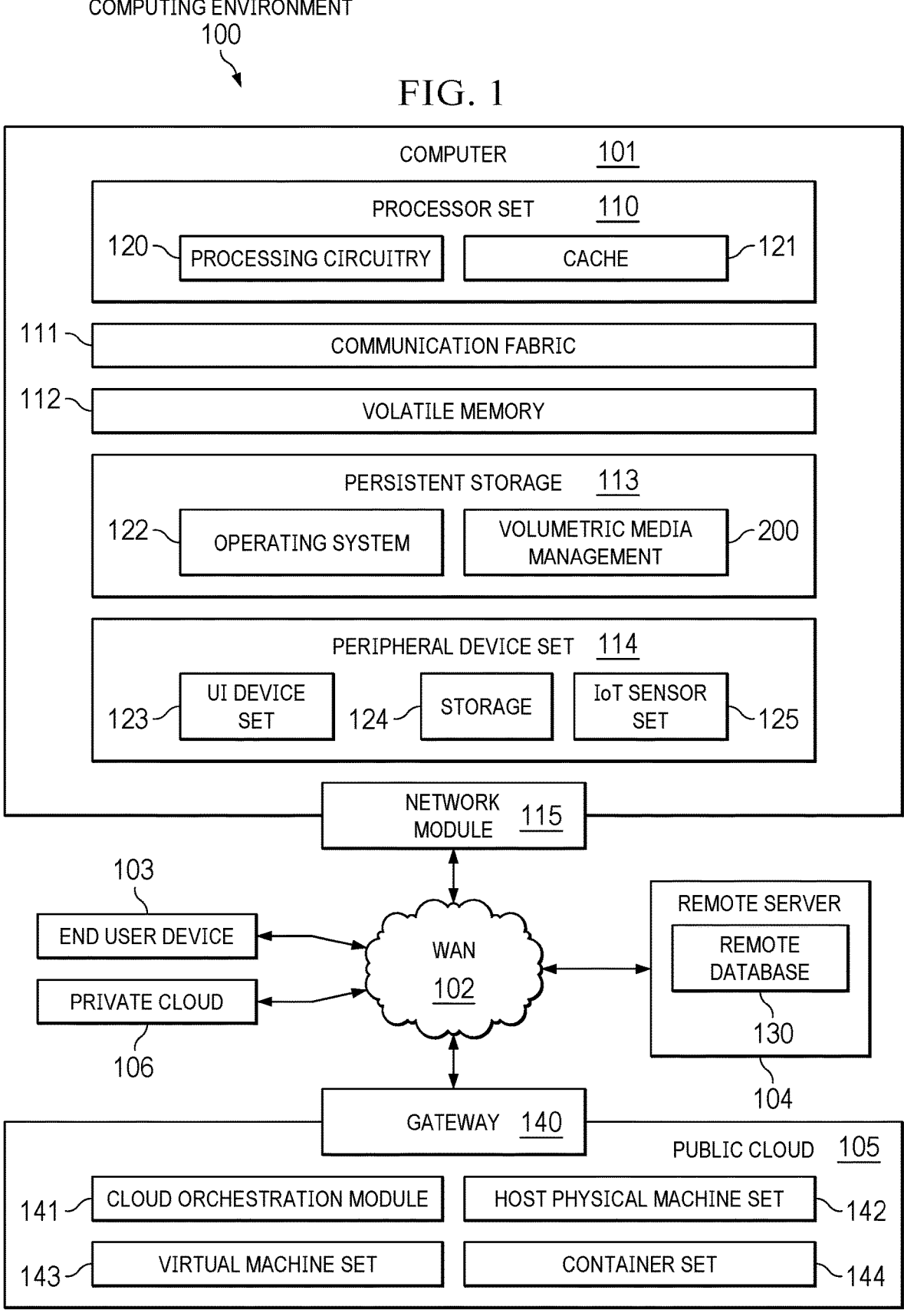

COMPUTER          101

PROCESSOR SET          110

120 — PROCESSING CIRCUITRY          CACHE — 121

111 — COMMUNICATION FABRIC

112 — VOLATILE MEMORY

PERSISTENT STORAGE          113

122 — OPERATING SYSTEM          VOLUMETRIC MEDIA MANAGEMENT — 200

PERIPHERAL DEVICE SET          114

123 — UI DEVICE SET          124 — STORAGE          IoT SENSOR SET — 125

NETWORK MODULE          115

103

END USER DEVICE

PRIVATE CLOUD

106

WAN          102

REMOTE SERVER

REMOTE DATABASE

130

104

GATEWAY          140

PUBLIC CLOUD          105

141 — CLOUD ORCHESTRATION MODULE          HOST PHYSICAL MACHINE SET — 142

143 — VIRTUAL MACHINE SET          CONTAINER SET — 144

300

SEGMENTING VOLUMETRIC MEDIA CONTENT WITH ROTATIONAL SPACES

BACKGROUND

The present disclosure relates generally to digital video data, and more specifically to cropping a select volume within a volumetric video image. Volumetric video technology leverages cameras and advanced data processing to render three-dimensional (3D) images in a virtual space, which allows for video points of view to be generated from any angle within that space to create an immersive experience for users. With volumetric video, a user can view the media from various directions and use virtual reality (VR) systems, 3D display systems, or any 2D display system. Social networks sites allow the creation of different types of photographs or media albums which can be shared among multiple users who can upload or manage media content.

SUMMARY

According to one illustrative embodiment, a computer-implement method performs receiving volumetric video data, wherein the volumetric video data is represented by a Bloch sphere. A user selected sub-volume is received to which the volumetric video data is to be cropped. A number of trained convolutional neural networks (CNNs) are applied to sub-spheres defined within the Bloch sphere, wherein the CNNs have different strides. The CNNs generate a correlation score for each sub-sphere relative to a user specified parameter. Best rotation matrices for the sub-spheres are determined to achieve a user specified angle of view for a cropped image, and the sub-sphere correlation scores are optimized according to the best rotation matrices. Cylindrical weights are applied to the sub-spheres according to the optimized correlation scores, and a best solution is selected for the user selected sub-volume according to the optimized sub-sphere correlation scores. The best rotation matrices are reflected orthogonally onto the user selected sub-volume, and the user selected sub-volume is cropped from the volumetric video data according to the sub-sphere with the highest correlation score to create the cropped image. According to other illustrative embodiments, a computer system and a computer program product for cropping volumetric media content are provided.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 1 depicts a pictorial representation of a computing environment in which illustrative embodiments may be implemented;

DETAILED DESCRIPTION

Figure 2:
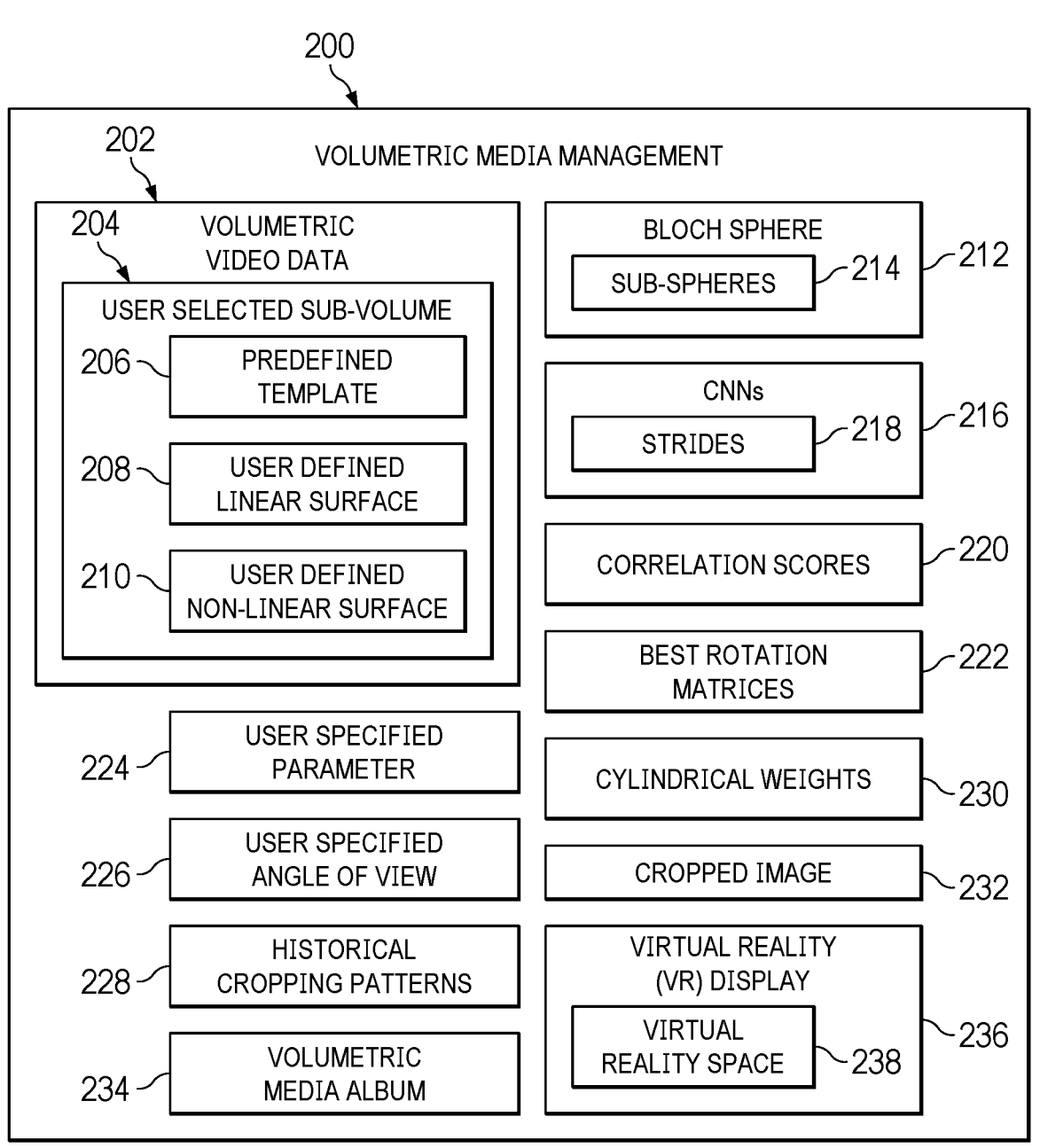
FIG. 2 depicts a bock diagram for volumetric media management in accordance with an illustrative embodiment.

A computer-implemented method performs reducing live range of variables for register allocation of structured control-flow programs. A number of processors to perform defining an affine expression for each static single assignment (SSA) variable contained in an input program for a computer compiler. The number of processors derive the affine expression of a SSA variable in the input program by substitution of affine expressions of input operands involved in computation of the SSA variable. The number of processors define dependence edges between nodes representing the SSA variables in a dependence graph, wherein source and destination of dependence edges represent definition and use of the SSA variables. The number of processors identify one or more overlapping dependence edges with a same source among the dependence edges and eliminate the longer of the overlapping dependence edges according to the derived affine expressions. As a result, the illustrative embodiments provide a technical effect of reducing the number of required process registers for the structured control-flow program.

As part of deriving the affine expressions the number of processors create an affine expression for each constant SSA variable in the input program with the expression values being the constant value of those variables. For non-constant SSA variables in the input program, the number of processors create an affine expression with expression value being itself via an identity map. The number of processors insert the constant SSA variables into a queue, and for each SSA variable "v" in the queue: pop the SSA variable from the queue; get the affine expression of the popped SSA variable; for each operation that uses the SSA variable "v", substitute the affine expression of the variable "v" in affine expressions of the operation results; and simplify the resultant expression linear algebraically. As a result, the illustrative embodiments provide a technical effect of propagating affine expressions through the SSAs of the input program.

Responsive to a determination the simplified expression is different from the original expression before substitution, the number of processors insert the results of the operation into the queue. As a result, the illustrative embodiments provide a technical effect of inserting the results of changed expressions into the queue.

As part of substituting the affine expression of the variable "v" in affine expressions of the operation results for an operation comprising arithmetic, the number of processors construct the affine expression of the operation results according to the specific arithmetic involved. As a result, the illustrative embodiments provide a technical effect of constructing affine expressions for arithmetic operations.

As part of substituting the affine expression of the variable "v" in affine expressions of the operation results for an operation comprising a loop with operation results, the number of processors sum the affine expressions of the initial value of its corresponding loop-carried variable with the product of the number of loop iterations and the constant offset present in each iteration to form the result for each operation. As a result, the illustrative embodiments provide a technical effect of constructing affine expressions for program loops.

As part of substituting the affine expression of the variable "v" in affine expressions of the operation results for an operation that is unfamiliar or undefined, the number of processors abstain from substitution of the affine expression of the used variable, wherein the operation is considered unsolvable. As a result, the illustrative embodiments provide a technical effect of identifying unsolvable operations.

As part of identifying the one or more overlapping dependence edges, for each dependence edge, the number of processors traverse the input program for a new SSA variable in reverse preorder starting from the end node of the dependence edge, wherein the new SSA variable is in scope and has a propagated expression as a function of the SSA variable used in the end node of the dependence edge. The number of processors replace an operand of the end node with the new SSA variable using the affine expression as a function. As a result, the illustrative embodiments provide a technical effect of identifying overlapping dependence edges.

As a part of identifying the one or more overlapping dependence edges, responsive to a determination multiple SSA variables in reverse preorder could contribute to replacement of the operand, the number of processors find the closest SSA variable based on dominance. As a result, the illustrative embodiments provide a technical effect of finding the closest SSA variable.

As part of reducing live range of variables for register allocation of structured control-flow programs the number or processors combine the affine expressions into groups, wherein the affine expressions in each group are the same except for constant terms. As a result, the illustrative embodiments provide a technical effect of grouping affine expressions.

A computer-implemented method performs reducing live range of variables for register allocation of structured control-flow programs. A number of processors define an affine expression for each static single assignment (SSA) variable contained in an input program for a computer compiler. The number of processors substitute affine expressions of input operands involved in computation of the SSA variables into the SSA variables. The number of processors remove at least one overlapping dependence edge between nodes representing the SSA variables in a dependence graph according to the substitution of the affine expressions into the SSA variables, wherein each overlapping dependent edge represents a required register in a processor. As a result, the illustrative embodiments provide a technical effect of reducing the number of required process registers for the structured control-flow program.

As part of removing the at least one overlapping dependent edge, for each dependence edge, the number of processors traverse the input program for a new SSA variable in reverse preorder starting from the end node of the dependence edge, wherein the new SSA variable is in scope and has a propagated expression as a function of the SSA variable used in the end node of the dependence edge. The number of processors replace an operand of the end node with the new SSA variable using the affine expression as a function. As a result, the illustrative embodiments provide a technical effect of identifying overlapping dependence edges.

As part of removing the at least one overlapping dependent edge, responsive to a determination multiple SSA variables in reverse preorder could contribute to replacement of the operand, the number of processors find the closest SSA variable based on dominance. As a result, the illustrative embodiments provide a technical effect of finding the closest SSA variable.

A computer-implemented method performs reducing live range of variables for register allocation of structured control-flow programs. A number of processors create an affine expression for each constant static single assignment (SSA) variable in an input program for a computer compiler, wherein the expression values are the constant value of those variables. For non-constant SSA variables in the input program, the number of processors create an affine expression with expression value being itself via an identity map. The number of processors insert the constant SSA variables into a queue. For each SSA variable in the queue the number of processors: pop the SSA variable from the queue; get the affine expression of the popped SSA variable; for each operation that uses the SSA variable, substitute the affine expression of the variable in affine expressions of the operation results and simplifying the resultant expression linear algebraically; and responsive to a determination the simplified expression is different from the original expression before substitution, insert the results of the operation into the queue. The number of processors remove at least one overlapping dependence edge between nodes representing the SSA variables in a dependence graph according to the substitution of the affine expressions, wherein each overlapping dependent edge represents a required register in a processor. As a result, the illustrative embodiments provide a technical effect of reducing the number of required process registers for the structured control-flow program.

As part of the substituting the affine expression of the variable in affine expressions of the operation results, for an operation comprising arithmetic, the number of processors construct the affine expression of the operation results according to the specific arithmetic involved. For an operation comprising a loop with operation results, the number of processors sum the affine expressions of the initial value of its corresponding loop-carried variable with the product of the number of loop iterations and the constant offset present in each iteration. For an operation that is unfamiliar or undefined, the number of processors abstain from substitution of the affine expression of the used variable, wherein the operation is considered unsolvable. As a result, the illustrative embodiments provide a technical effect of substituting the affine expression of the variable in affine expressions of the operation results and identifying unsolvable operations.

A computer system comprises a storage device that stores program instructions and one or more processors operably connected to the storage device and configured to execute the program instructions to cause the system to define an affine expression for each static single assignment (SSA) variable contained in an input program for a computer compiler; derive the affine expression of a SSA variable in the input program by substitution of affine expressions of input operands involved in computation of the SSA variable; define dependence edges between nodes representing the SSA variables in a dependence graph, wherein source and destination of dependence edges represent definition and use of the SSA variables; identify one or more overlapping dependence edges with a same source among the dependence edges; and eliminate the longer of the overlapping dependence edges according to the derived affine expressions. As a result, the illustrative embodiments provide a technical effect of reducing the number of required process registers for the structured control-flow program.

As part of deriving the affine expressions the number of processors create an affine expression for each constant SSA variable in the input program with the expression values being the constant value of those variables. For non-constant SSA variables in the input program, the number of processors create an affine expression with expression value being itself via an identity map. The number of processors insert the constant SSA variables into a queue, and for each SSA variable "v" in the queue: pop the SSA variable from the queue; get the affine expression of the popped SSA variable; for each operation that uses the SSA variable "v", substitute the affine expression of the variable "v" in affine expressions of the operation results; and simplify the resultant expression linear algebraically. As a result, the illustrative embodiments provide a technical effect of propagating affine expressions through the SSAs of the input program.

Responsive to a determination the simplified expression is different from the original expression before substitution, the number of processors insert the results of the operation into the queue. As a result, the illustrative embodiments provide a technical effect of inserting the results of changed expressions into the queue.

As part of substituting the affine expression of the variable "v" in affine expressions of the operation results for an operation comprising arithmetic, the number of processors construct the affine expression of the operation results according to the specific arithmetic involved. As a result, the illustrative embodiments provide a technical effect of constructing affine expressions for arithmetic operations.

As part of substituting the affine expression of the variable "v" in affine expressions of the operation results for an operation comprising a loop with operation results, the number of processors sum the affine expressions of the initial value of its corresponding loop-carried variable with the product of the number of loop iterations and the constant offset present in each iteration to form the result for each operation. As a result, the illustrative embodiments provide a technical effect of constructing affine expressions for program loops.

As part of substituting the affine expression of the variable "v" in affine expressions of the operation results for an operation that is unfamiliar or undefined, the number of processors abstain from substitution of the affine expression of the used variable, wherein the operation is considered unsolvable. As a result, the illustrative embodiments provide a technical effect of identifying unsolvable operations.

As part of identifying the one or more overlapping dependence edges, for each dependence edge, the number of processors traverse the input program for a new SSA variable in reverse preorder starting from the end node of the dependence edge, wherein the new SSA variable is in scope and has a propagated expression as a function of the SSA variable used in the end node of the dependence edge. The number of processors replace an operand of the end node with the new SSA variable using the affine expression as a function. As a result, the illustrative embodiments provide a technical effect of identifying overlapping dependence edges.

As a part of identifying the one or more overlapping dependence edges, responsive to a determination multiple SSA variables in reverse preorder could contribute to replacement of the operand, the number of processors find the closest SSA variable based on dominance. As a result, the illustrative embodiments provide a technical effect of finding the closest SSA variable.

As part of reducing live range of variables for register allocation of structured control-flow programs the number or processors combine the affine expressions into groups, wherein the affine expressions in each group are the same except for constant terms. As a result, the illustrative embodiments provide a technical effect of grouping affine expressions.

A computer program product performs reducing live range of variables for register allocation of structured control-flow programs. A persistent storage medium having program instructions configured to cause one or more processors to: define an affine expression for each static single assignment (SSA) variable contained in an input program for a computer compiler; derive the affine expression of a SSA variable in the input program by substitution of affine expressions of input operands involved in computation of the SSA variable; define dependence edges between nodes representing the SSA variables in a dependence graph, wherein source and destination of dependence edges represent definition and use of the SSA variables; identify one or more overlapping dependence edges with a same source among the dependence edges; and eliminate the longer of the overlapping dependence edges according to the derived affine expressions. As a result, the illustrative embodiments provide a technical effect of reducing the number of required process registers for the structured control-flow program.

As part of deriving the affine expressions the number of processors create an affine expression for each constant SSA variable in the input program with the expression values being the constant value of those variables. For non-constant SSA variables in the input program, the number of processors create an affine expression with expression value being itself via an identity map. The number of processors insert the constant SSA variables into a queue, and for each SSA variable "v" in the queue: pop the SSA variable from the queue; get the affine expression of the popped SSA variable; for each operation that uses the SSA variable "v", substitute the affine expression of the variable "v" in affine expressions of the operation results; and simplify the resultant expression linear algebraically. As a result, the illustrative embodiments provide a technical effect of propagating affine expressions through the SSAs of the input program.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium May be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIG. 1, a diagram of a data processing environment is provided in which illustrative embodiments may be implemented. It should be appreciated that FIG. 1 is only meant as an example and are not intended to assert or imply any limitation with regard to the environments in which different embodiments may be implemented. Many modifications to the depicted environment may be made.

FIG. 1 depicts a pictorial representation of a computing environment in which illustrative embodiments may be implemented. Computing environment 100 contains an example of an environment for the execution of at least some of the computer code involved in performing the inventive methods, such as volumetric media management 200. In addition to volumetric media management graph 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and volumetric media management 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in volumetric media management 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. Volumetric media management instructions included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account that social networks sites allow the creation of different types of photographs or media albums which can be shared among multiple users who can upload or manage media content.

The illustrative embodiments also recognize and take into account that going forward, personal devices such as mobile phones will have capabilities for capturing. This personalized volumetric media data is to be stored in a media album, which requires proper management of volumetric media data within the volumetric media library.

The illustrative embodiments provide a method of cropping images from volumetric video data from a user specific perspective. The volumetric video is represented by a Bloch sphere which is searched for volumetric shapes that fit to block sphere correlation score boundaries. Convolutional neural networks (CNNs) are applied to sub-spheres within the Bloch sphere to generate correlation scores for the sub-spheres representing frames within the volumetric video.

While storing volumetric video contents in any volumetric media album, the user can crop the volumetric video by slicing the video from one or more directions (perspectives). The cropped volumetric video data can be stored in the volumetric media library, thereby reducing the storage capacity requirements from the original uncropped volumetric video data.

While cropping any volumetric video content, the user can perform linear or non-linear slicing from different sides/perspectives of the volumetric video image. Linear slicing comprises slicing the image along straight lines, whereas non-linear slicing allows the user to trace around non-linear shapes within the volumetric video. These slicing options enable the user to create appropriate shapes for the cropped volumetric images for storage in the media library. The user might use a predefined cropping template to select a cropped volume within the volumetric media content. The user might also customize and alter the predefined cropping template.

Using a VR device such as a VR headset or smart glasses, the user can arrange cropped or un-cropped volumetric media contents such that, within a limited virtual space, the user can arrange the volumetric media contents. This reduced virtual space for arranging the volumetric media can help the user to navigate the volumetric media album with less required virtual mobility.

The user can use the VR device to selectively merge one or more cropped or uncropped volumetric media content in the volumetric media album. The resulting merged volumetric media content can also be stored in the volumetric media album. Based on the need to merge two or more volumetric media, the user can perform selective cropping of the candidate volumetric media contents and merge them to create a single volumetric media content.

The illustrative embodiments allow user to define a digital expiration of the volumetric media content, which establishes a lifecycle planning mechanism for content generation with volumetric video data. The objects generated within the volumetric media content can be aged for a prescribed period of temporal expiration at the object or file level. The expiration planning FIG. 2 depicts a bock diagram for volumetric media management 200 in accordance with an illustrative embodiment. Volumetric media management 200 allows users to manipulate raw volumetric video data 202 to produce a cropped image 232.

The cropped image 232 is produced by carving a user specified sub-volume 204 out of the volumetric video data 202. Using a VR display 236, the user can virtually move around the image of the volumetric video data 202 with a virtual reality space 238 to select the desired sub-volume (see FIG. 5). The user can choose a user specific angle of view 226 from which to generate the cropped image 232.

The user selected sub-volume 204 can be selected by the user in a number of ways. The user selected sub-volume 204 might comprise a predefined template 206 that the user selects from among a number of templates. Alternatively, or in addition to the predefined template 206, the user might manually define a linear surface 208 and/or a non-linear surface 210 using VR display 236. In other words, the user can manually "draw" a virtual boundary line around the desired area or object within volumetric video data 202 to define the user selected sub-volume 204. The user might do so from scratch or to modify and customize a predefined template 206.

In addition, volumetric media management 200 might employ machine learning to suggest sub-volumes for cropping based on historical cropping patterns 228. These historical cropping patterns 228 might be based on a specific user's or group of users' past cropping of volumetric data as well as analysis of the volumetric video data 202 in question to work optimally within the constraints of that data.

Figure 3:
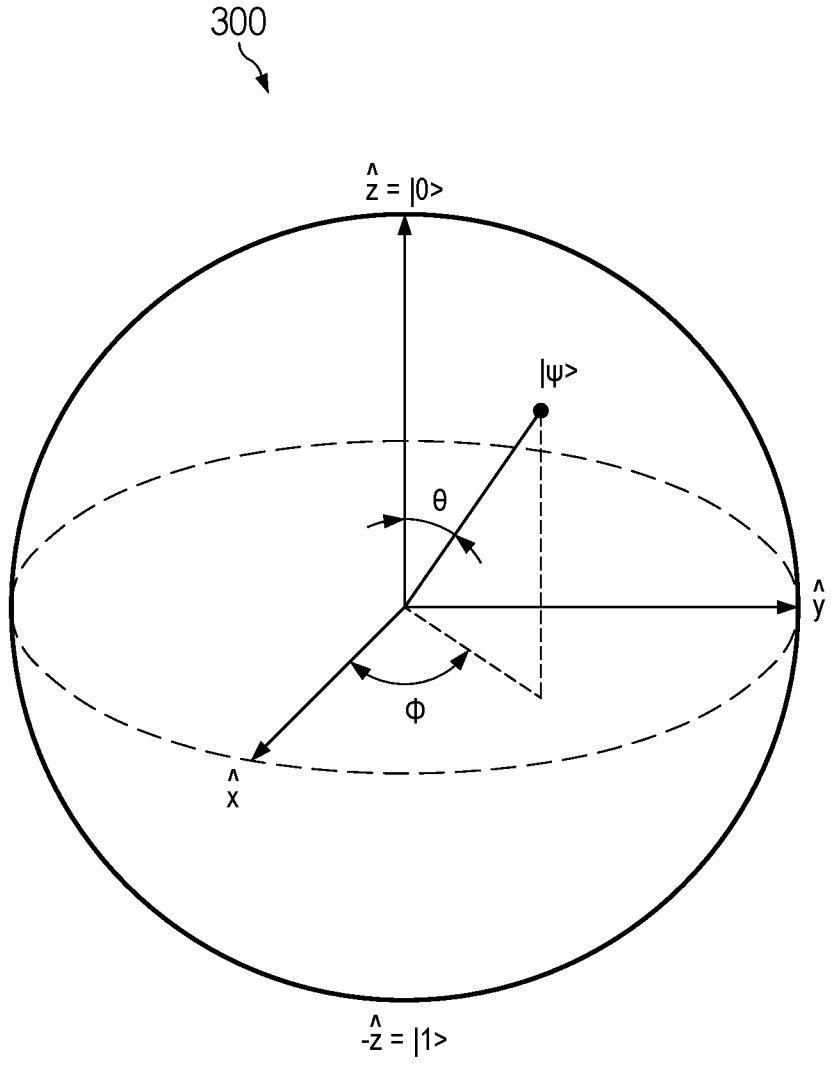
FIG. 3 depicts a diagram of an example Bloch sphere with which the illustrative embodiments might be implemented.

The volumetric video data 202 is represented by a Bloch sphere 212 (see FIG. 3). The Bloch sphere 212 can be divided into a number of sub-spheres 214 which represent frames within the volumetric video data 202. Volumetric media management 200 applies a number of CNNs 216 to the sub-spheres 214 of Bloch sphere 212. Each sub-sphere 214 has a respective CNN that is applied for a number of iterations. CNNs 216 have a number of different strides 218 such that when a CNN is applied to a sub-sphere the CNN has a different stride for each iteration.

Stride is a hyperparameter that refers to the step size that the convolutional filter of the CNN takes when moving across an image. For example, a stride of 1 means the filter moves one pixel at a time, a stride of 2 means the filter moves two pixels at a time, etc. As stride increases, the spatial dimensions of the output decreases, resulting in a downsampled representation of the original image. Padding can be used in conjunction with stride to counteract the reduction of size and preserve spatial dimensions with increasing stride by adding extra border pixel to the input image (thereby increasing its size) before applying the convolutional operations.

CNNs 216 generate respective correlations scores 220 for the sub-spheres 214 with respect to a user specified parameter 224. This user specified parameter 224 might be related to the visual effect the user wants to achieve such as, e.g., blurring a background to emphasize an object of interest for the cropped image 232. As another example, the user specified parameter might be a designated favorite image or images in a volumetric media album 234. In which case, the CNNs 216 will assign higher correlation scores 220 to sub-spheres 214 that more closely match qualities of the favorite image(s).

Volumetric media management 200 determines best rotation matrices 222 for the sub-spheres 214 to achieve the user specified angle of view 226 for the cropped image 232. A rotation matrix is a mathematical matrix that can be used to rotate an image in two or three dimensions. It is used to transform coordinates, objects, or vectors in space. In the context of volumetric media management 200, rotation matrices allow the user to see the volumetric video data 202 from different angles as the user virtually moves within the virtual reality space 238.

Figure 4:
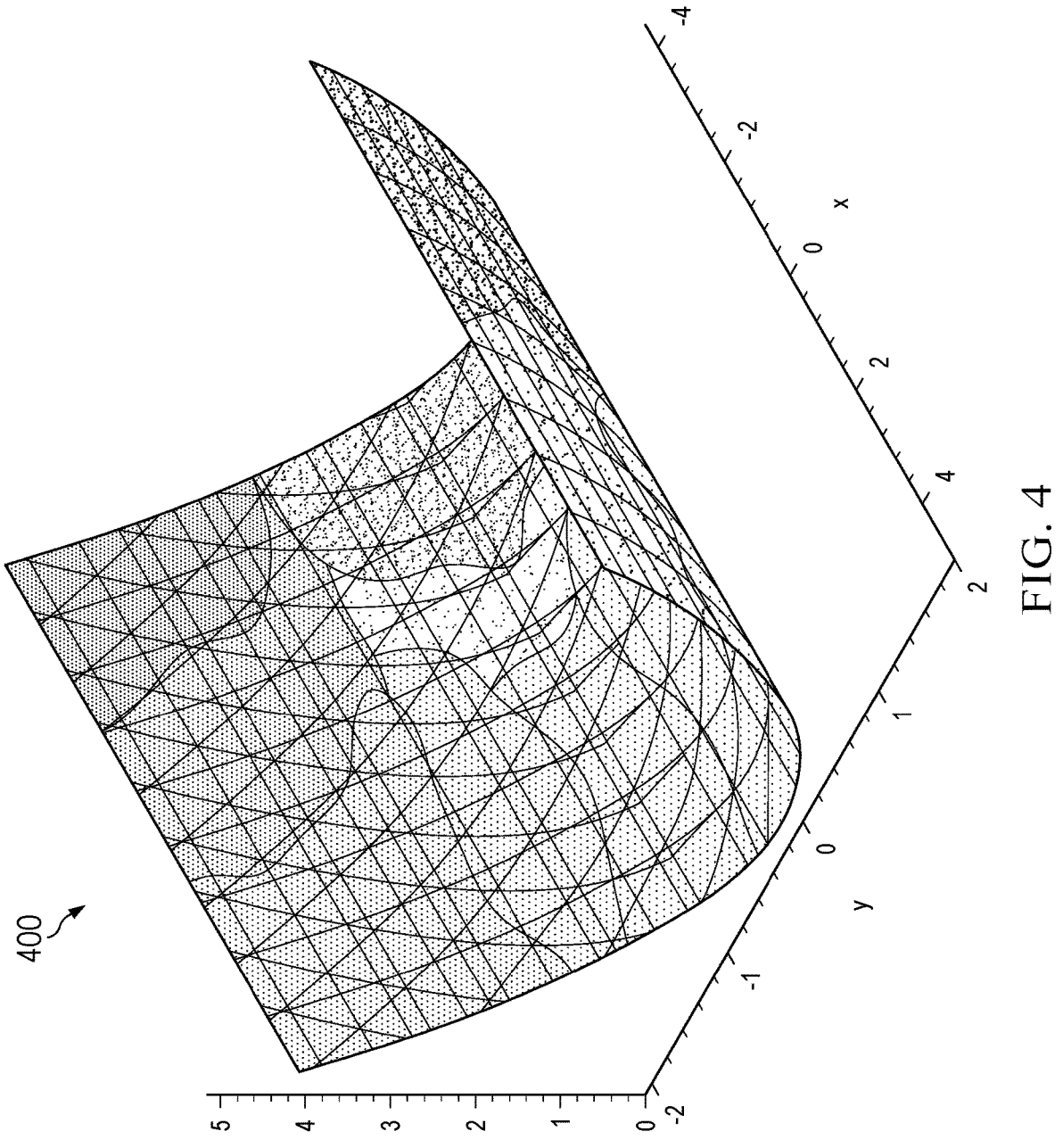
FIG. 4 depicts a diagram illustrating cylindrical weighting of correlation scores in accordance with an illustrative embodiment.

Volumetric media management 200 optimizes the correlation scores 220 according to the best rotation matrices 222 and applies cylindrical weights 230 to the sub-spheres 214 according to the optimized correlation scores 220 (see FIG. 4). Cylindrical weighting assigns weights to data points within a three-dimensional cylindrical coordinate system. Data points are distributed in this cylindrical coordinate system, and weights are assigned according to the position of the data points within the cylinder. Typically, higher weights are assigned to data points closer to the central axis of the cylinder. The above optimization and weighting allows volumetric media management 200 to determine the sub-spheres 214 (frames) that best represent and fit the user selected sub-volume 204 with volumetric video data 202 according to the user specified parameter 224 and user specified angle of view 226 to generate cropped image 232.

After cropping, the cropped image 232 can be stored in the volumetric media album 234 along with the original raw volumetric video data 202. Users with access to the volumetric media album 234 may be able to edit or manipulate cropped image 232 or merge it with other cropped images.

FIG. 3 depicts a diagram of an example Bloch sphere with which the illustrative embodiments might be implemented. The volumetric video is represented by Bloch sphere 300. The rotation of Bloch sphere 300 is determined with a search space and is represented as:

$$\overline{rotation} = \alpha \,|\, 0 > + \beta \,|\, 1 > \alpha, \beta \epsilon C$$

$$\overline{rotation} = \alpha \,|\, 0 > + e^{i\phi} \beta \,|\, 1 > \alpha, \beta \epsilon R \; \alpha, \beta \epsilon R$$

In polar form, the above equation becomes:

$$\overline{rotation} = \cos\left(\frac{\theta}{2}\right)\left| 0 > + e^{i\phi} \sin\left(\frac{\theta}{2}\right)\right|$$

where $$e^{i\phi} = \cos(\phi) + i\sin(\phi)$$

$$\overline{rotation} = \cos\left(\frac{\theta}{2}\right)\left| 0 > + (\cos(\phi) + i\sin(\phi))\sin\left(\frac{\theta}{2}\right)\right|$$

Each of the pixel groups within a sub-sphere is entered into a CNN. The CNN pads the regions and pools the region together to produce a single correlation score. The correlation score is related to the type of CNN selected and that corresponding stride of the CNN. For example, is a user shares favorite images in a volumetric media album, a group of CNN can be trained on those favorite images. In this manner, the correlation score is related to a personalized score of a sub-sphere.

FIG. 4 depicts a diagram illustrating cylindrical weighting of correlation scores in accordance with an illustrative embodiment. The θ and Ø are searched to optimize a splice's summed correlation score. The correlation scores are weighted based on the surface of a cylinder 400 such that the correlation scores in the center are worth more than those at the edges.

The selected θ and Ø are then used to rotate the selected splice volume for cropping the volumetric image according to a user specified angle of view for a cropped image. The process of slicing can continue for different shapes and sub-volumes. Narrow regions within the Bloch sphere 300 can be discovered that optimizes a sub-volume's correlation score. The lines are connected to best fit the user selected volume shapes for cropping. From there, the shape can be spliced from the original volumetric image.

Figure 5:
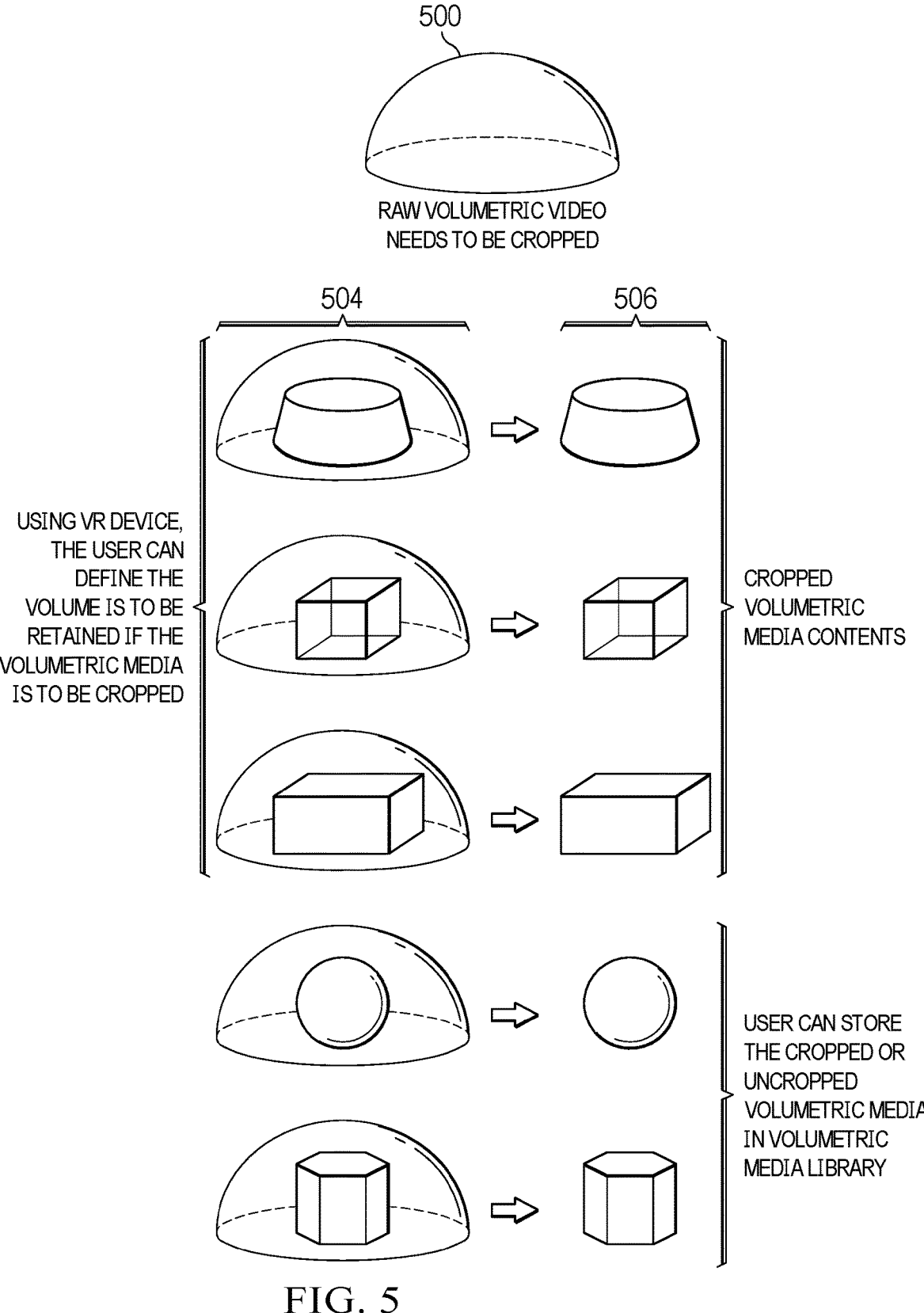
FIG. 5 illustrates a process for cropping different possible sub-volumes from a volumetric video image in accordance with an illustrative embodiment.

FIG. 5 illustrates a process for cropping different possible sub-volumes from a volumetric video image in accordance with an illustrative embodiment. In the process illustrated in FIG. 5, raw volumetric video image 502 is captured with multiple camera participation from different angles of view. The user devices used to capture the raw volumetric video image 502 might include various camera devices including augmented reality (AR) or smart glasses. The raw volumetric video image 502 can be captured with multiple users surrounding the area represented by the raw volumetric video image 502.

After the raw volumetric video image 502 is captured, a user might want to crop it by identifying portions of the raw volumetric video image 502 that are not important. Using a VR device such as a RV headset or smart glasses, the user defines one of a number of possible sub-volumes 504 to be retained after the rest of the raw volumetric video image 502 is cropped. The user can perform virtual mobility around the raw volumetric video image 502 from one location to another. Based on analysis of the raw volumetric video image 502 such as quality of images on different sides, the direction of view, unwanted objects in view, a recommendation can be provided proposed which angle or side of the raw volumetric video image 502 to use for cropping.

The user can select which raw volumetric video image 502 is to be cropped and from which direction. Using the VR device, the user can select from among predefined templates of possible sub-volume 504 and/or manually define any linear or non-linear surface on the raw volumetric video image 502 to designate which portions are required and which portions can be removed. The user can also change the profile of the linear surface to a non-linear profile or vice versa.

Based on historical cropping patterns of volumetric video and the above analysis of the raw volumetric video image 502 the system can identify which portions can be cropped within the given constraints of the raw volumetric video image 502.

According to the selection of the surface profile of the desired sub-volume, the system crops the selected sub-volume from the raw volumetric video image 502. After cropping, the remaining cropped volumetric media contents 506 can be stored in a volumetric media album, possibly along with the uncropped raw volumetric video image 502.

The user may use the VR device to store and arrange the cropped volumetric media contents 506 in the volumetric media album according to shape and dimension. Based on the shape and dimension of the cropped and uncropped images, the user can arrange the data in the volumetric media album to reduce or minimize the amount of virtual movement needed to move around the volumetric media content within the virtual space.

Both the raw volumetric video image 502 and cropped volumetric media contents 506 in the volumetric media album can be shared with other users, allowing them to interact with the data. Participating users can collaborate with each other on the same data and can generate alternate cropping of raw volumetric video image 502 from different directions and angles of view.

Users may also merge two or more volumetric images with the volumetric media album. If such a merger requires additional cropping of the volumetric images, the system can analyze the volumetric media and recommend appropriate cropping. Once the user selects the candidate volumetric images for merging, the system can merge them according to the edge criteria of the individual volumetric images in question. Once the volumetric images are merged they can be displayed in VR with the appropriate comparative dimensions.

Figure 6:
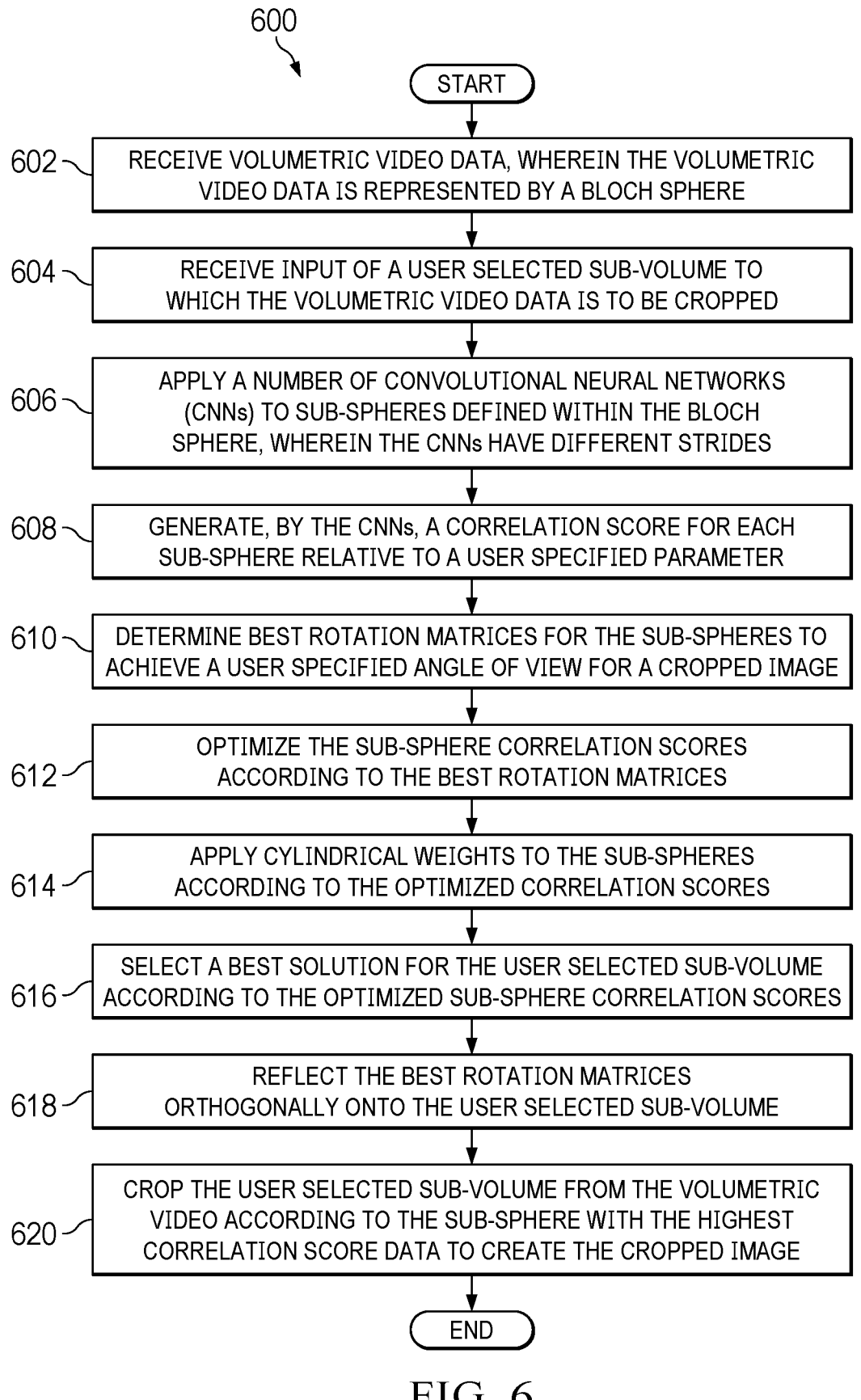
FIG. 6 depicts a flowchart illustrating a process for reducing live range of variables for register allocation of structured control-flow programs in accordance with an illustrative embodiment.

FIG. 6 depicts a flowchart illustrating a process for cropping volumetric media content in accordance with an illustrative embodiment. Process 600 can be carried out in computing environment 100 in FIG. 1.

Process 600 begins by receiving volumetric video data, wherein the volumetric video data is represented by a Bloch sphere (step 602) and receiving input of a user selected sub-volume to which the volumetric video data is to be cropped (step 604). The user selected sub-volume might comprise a predefined template. The user selected sub-volume might also comprise a user defined linear surface and/or a user defined non-linear surface. Process 600 might also identify portions of the volumetric video data can be cropped according to historical cropping patterns.

Process 600 applies a number of convolutional neural networks (CNNs) to sub-spheres defined within the Bloch sphere, wherein the CNNs have different strides (step 606). The sub-spheres represent video frames within the volumetric video data. Each image change within a sub-sphere is processed by a different CNN.

The CNNs generate a correlation score for each sub-sphere relative to a user specified parameter (step 608). Process 600 determines best rotation matrices for the sub-spheres to achieve a user specified angle of view for a cropped image (step 610). Process 600 then optimizes the sub-sphere correlation scores according to the best rotation matrices (step 612).

Process 600 applies cylindrical weights to the sub-spheres according to the optimized correlation scores (step 614) and selecting a best solution for the user selected sub-volume according to the optimized sub-sphere correlation scores (step 616).

Process 600 reflects the best rotation matrices orthogonally onto the user selected sub-volume (618) and crops the user selected sub-volume from the volumetric video data according to the sub-sphere with the highest correlation score to create the cropped image (step 620). Process 600 then end.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present disclosure have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method for cropping volumetric media content, the method comprising:

receiving volumetric video data, wherein the volumetric video data is represented by a Bloch sphere;

receiving input of a user selected sub-volume to which the volumetric video data is to be cropped;

applying a number of convolutional neural networks (CNNs) to sub-spheres defined within the Bloch sphere, wherein the CNNs have different strides;

generating, by the CNNs, a correlation score for each sub-sphere relative to a user specified parameter;

determining best rotation matrices for the sub-spheres to achieve a user specified angle of view for a cropped image;

optimizing the sub-sphere correlation scores according to the best rotation matrices;

applying cylindrical weights to the sub-spheres according to the optimized correlation scores;

selecting a best solution for the user selected sub-volume according to the optimized sub-sphere correlation scores;

reflecting the best rotation matrices orthogonally onto the user selected sub-volume; and cropping the user selected sub-volume from the volumetric video data according to the sub-sphere with the highest correlation score to create the cropped image.

2. The method of claim 1, wherein the sub-spheres represent video frames within the volumetric video data.

3. The method of claim 1, wherein each image change within a sub-sphere is processed by a different CNN.

4. The method of claim 1, wherein the user selected sub-volume comprises a predefined template.

5. The method of claim 1, wherein the user selected sub-volume comprises a user defined linear surface.

6. The method of claim 1, wherein the user selected sub-volume comprises a user defined non-linear surface.

7. The method of claim 1, further comprising identifying portions of the volumetric video data can be cropped according to historical cropping patterns.

8. A system for cropping volumetric media content, the system comprising:

a storage device that stores program instructions;

one or more processors operably connected to the storage device and configured to execute the program instructions to cause the system to:

receive volumetric video data, wherein the volumetric video data is represented by a Bloch sphere;

receive input of a user selected sub-volume to which the volumetric video data is to be cropped;

apply a number of convolutional neural networks (CNNs) to sub-spheres defined within the Bloch sphere, wherein the CNNs have different strides;

generate, by the CNNs, a correlation score for each sub-sphere relative to a user specified parameter;

determine best rotation matrices for the sub-spheres to achieve a user specified angle of view for a cropped image;

optimize the sub-sphere correlation scores according to the best rotation matrices;

apply cylindrical weights to the sub-spheres according to the optimized correlation scores;

select a best solution for the user selected sub-volume according to the optimized sub-sphere correlation scores;

reflect the best rotation matrices orthogonally onto the user selected sub-volume; and crop the user selected sub-volume from the volumetric video data according to the sub-sphere with the highest correlation score to create the cropped image.

9. The system of claim 8, wherein the sub-spheres represent video frames within the volumetric video data.

10. The system of claim 8, wherein each image change within a sub-sphere is processed by a different CNN.

11. The system of claim 8, wherein the user selected sub-volume comprises a predefined template.

12. The system of claim 8, wherein the user selected sub-volume comprises a user defined linear surface.

13. The system of claim 8, wherein the user selected sub-volume comprises a user defined non-linear surface.

14. A computer program product for cropping volumetric media content, the computer program product comprising:

a computer readable storage medium having program instructions configured to cause one or more processors to:

receive volumetric video data, wherein the volumetric video data is represented by a Bloch sphere;

receive input of a user selected sub-volume to which the volumetric video data is to be cropped;

apply a number of convolutional neural networks (CNNs) to sub-spheres defined within the Bloch sphere, wherein the CNNs have different strides;

generate, by the CNNs, a correlation score for each sub-sphere relative to a user specified parameter;

determine best rotation matrices for the sub-spheres to achieve a user specified angle of view for a cropped image;

optimize the sub-sphere correlation scores according to the best rotation matrices;

apply cylindrical weights to the sub-spheres according to the optimized correlation scores;

select a best solution for the user selected sub-volume according to the optimized sub-sphere correlation scores;

reflect the best rotation matrices orthogonally onto the user selected sub-volume; and crop the user selected sub-volume from the volumetric video data according to the sub-sphere with the highest correlation score to create the cropped image.

15. The computer program product of claim 14, wherein the sub-spheres represent video frames within the volumetric video data.

16. The computer program product of claim 14, wherein each image change within a sub-sphere is processed by a different CNN.

17. The computer program product of claim 14, wherein the user selected sub-volume comprises a predefined template.

18. The computer program product of claim 14, wherein the user selected sub-volume comprises a user defined linear surface.

19. The computer program product of claim 14, wherein the user selected sub-volume comprises a user defined non-linear surface.

20. The computer program product of claim 14, further comprising instructions for identifying portions of the volumetric video data can be cropped according to historical cropping patterns.

\* \* \* \* \*